United States Patent
Bui et al.

(10) Patent No.: US 7,280,307 B2
(45) Date of Patent: Oct. 9, 2007

(54) TRACK FOLLOWING SERVO ACTUATOR OFFSET CALIBRATION FOR TAPE DRIVE

(75) Inventors: Nhan Bui, Tucson, AZ (US); Ernest Gale, Tucson, AZ (US); Eiji Ogura, Yokohama (JP); Kazuhiro Tsuruta, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 58 days.

(21) Appl. No.: 11/351,774

(22) Filed: Feb. 10, 2006

(65) Prior Publication Data

US 2007/0188910 A1 Aug. 16, 2007

(51) Int. Cl.
*G11B 21/02* (2006.01)

(52) U.S. Cl. .................................... 360/75; 360/77.12

(58) Field of Classification Search ............... None
See application file for complete search history.

(56) References Cited

U.S. PATENT DOCUMENTS 7,110,212 B2 * 9/2006 Bui et al. ............... 360/77.12

* cited by examiner

*Primary Examiner*—K. Wong
(74) *Attorney, Agent, or Firm*—Dan Shifrin

(57) ABSTRACT

A magnetic tape drive, having a compound servo actuator, reduces the possibility of overshoots of servo elements when a tape cartridge is loaded, thereby reducing servo failures. The coarse motor is activated, then deactivated when the servo elements locate a servo pattern on the tape. After initialization of a DAC offset in the servo controller to 0, the position of the fine actuator is read. The fine actuator is enabled, with a DAC input of 0 and, after a short wait, the position is again read. The new DAC offset equals the initial DAC offset plus the difference between the two positions. If the difference is less than a predetermined threshold, the servo controller may obtain a lock on the servo signals and commence tracking. If the difference is not less, the process is repeated, with the DAC offset being adjusted each time, until the difference is less than a predetermined threshold.

18 Claims, 2 Drawing Sheets

TRACK FOLLOWING SERVO ACTUATOR OFFSET CALIBRATION FOR TAPE DRIVE

TECHNICAL FIELD

The present invention relates generally to magnetic tape drives for data storage and, in particular, to calibrating a track following servo in a tape drive.

BACKGROUND ART

A high capacity data storage tape includes a number of tracks (such as 16, 32, 64, 128 etc.) onto which data is written and read from by read/write elements mounted on a head. The tape (also referred to as the medium) also includes one or more servo tracks on which a pattern of servo signals has been recorded. Servo elements mounted on the head read the servo pattern and feed them into a servo control loop. The servo loop, in response, controls the position of the head to maintain the servo elements substantially centered within the servo pattern, thereby ensuring that the read/write elements are accurately aligned relative to the data tracks despite lateral movement of the tape as it travels from one reel to the other.

When a tape cartridge is loaded into a drive, a coarse motor is activated and moves the entire head assembly across the tape until the servo elements detect a servo pattern. A fine actuator, to which the servo and read/write elements are mounted on flextures, is then activated. A voice coil motor (VCM), as part of the servo loop, deflects the flextures to maintain a track following position. For high speed and accuracy, the servo loop should have a high bandwidth and the VCM driver should have a high gain. However, the high gain, as well as a sticky actuator and offsets in the digital-to-analog converter (DAC) feeding the driver, may contribute to excessive movement of the head when the fine actuator is activated. As a result, the servo elements may land outside of the areas of the tape on which the servo patterns are recorded, leading to a servo failure due to the lack of servo signal detection to feed back into the servo loop.

Consequently, a need remains for a compound tape actuator which is fast, highly accurate but is able also to reduce the possibility of overshoot when a tape cartridge is loaded into a drive.

SUMMARY OF THE INVENTION

The present invention provides a magnetic tape drive with a compound (coarse/fine) servo actuator which reduces the possibility of overshoots by the servo elements when a tape cartridge is loaded into the drive, thereby reducing servo failures. The coarse motor is first activated, then deactivated when the servo elements locate a servo pattern on the tape. After initialization of a DAC offset in the servo controller to 0, the position of the fine actuator is read. The fine actuator is enabled, with a DAC input of 0 and, after a short wait, the position is again read. The new DAC offset equals the initial DAC offset plus the difference between the two positions. If the difference is less than a predetermined threshold, the servo controller may obtain a lock on the servo signals and commence tracking. If the difference is not less than the predetermined threshold, the process is repeated, with the DAC offset being adjusted each time, until the difference is less than a predetermined threshold or an error is declared. The process may be adaptive in that, if the difference between the two positions does not become less than the predetermined threshold, the time of the short wait may be adjusted. The resulting DAC offset may be stored and used as the initial offset when another cartridge is loaded.

DETAILED DESCRIPTION OF THE PREFERRED EMBODIMENT

Figure 1:
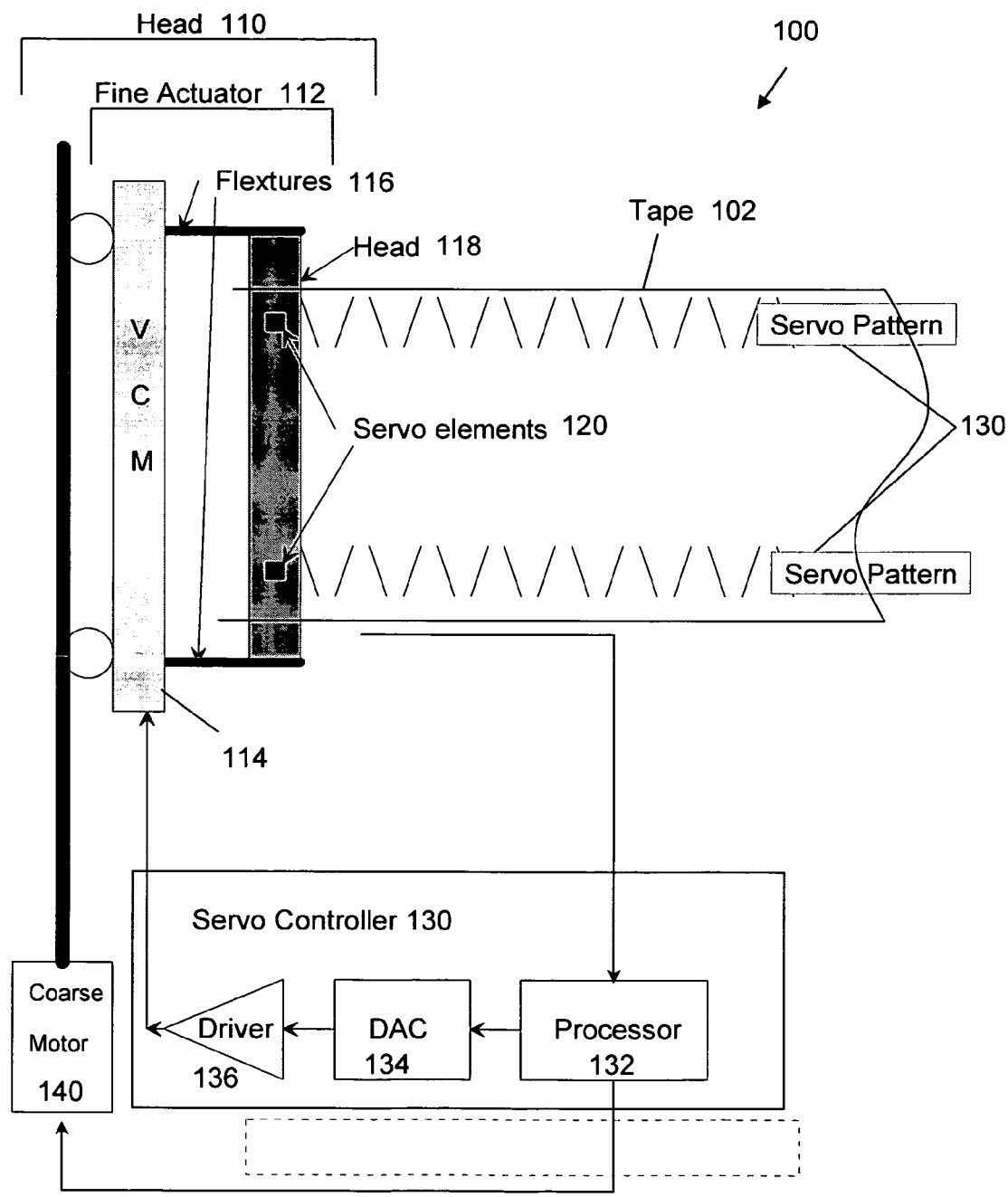
FIG. 1 is a block diagram of a tape head and servo controller in which the present invention may be implemented.

FIG. 1 is a block diagram of a portion of a tape drive system 100, including a tape head assembly 110, a servo controller 130 and a coarse motor 140 in which the present invention may be implemented. Also illustrated is a representative servo pattern 130 recorded in two outer tracks of the tape media 102. The head assembly 110 includes a fine actuator 112, having a voice coil motor 114 and a pair of flextures 116, and the head itself 118. The head 118 includes two servo elements 120, corresponding in position with the servo tracks 130, and a read/write elements (not shown) spaced between the servo elements 120. It will be appreciated that the specific arrangement of elements on the head 118 in FIG. 1 is not critical to the invention. The present invention is applicable to other configurations, including a head with a single servo element or one with more than two servo elements. The servo controller 130 includes a processor 132, a digital-to-analog converter (DAC) 134 and a VCM driver 136. The processor 132 includes an input to receive position signals fed back from the servo elements 120, a first output through which the coarse motor is controlled, and a second output through which the DAC 132 is provided with an input value. The DAC 134 includes an input, coupled to receive the output from the processor 132, and an output through which the driver 136 is provided with a current. The driver 136 includes an input, coupled to receive the DAC 134 output, and an output coupled to drive the VCM 114 of the fine actuator 112. The processor 132, the DAC 134, the driver 136, the VCM 114 and the servo elements 120 comprise a servo loop.

Figure 2:
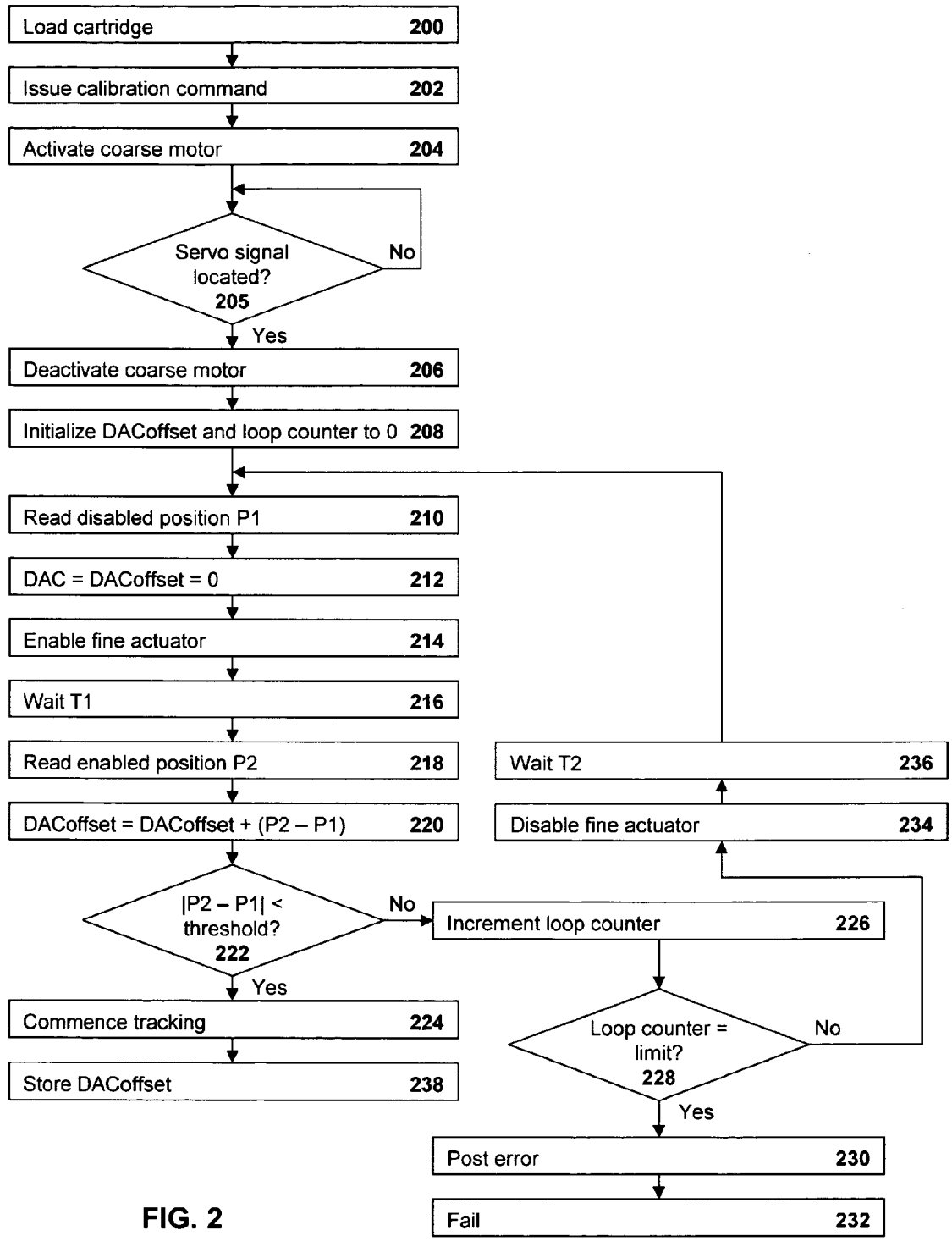
FIG. 2 is a flowchart of a method according to the present invention.

The operation of the present invention will now be described with reference to the flowchart of FIG. 2. A cartridge housing tape media is loaded into the tape drive (step 200) and a calibration command issued (step 202). The coarse motor is activated while the fine actuator 112 is disabled to seek a servo signal (step 204). When a servo signal is located by the servo elements 120 (step 205), the coarse motor is deactivated (step 206). In the processor 132, an offset to be input to the DAC 134, DACoffset, and a counter are both initialized to zero (step 208). Without attempting to move the fine actuator 112, processor 132 reads the initial position P1 of the fine actuator 112 (step 210).

There is no initial DAC offset; ie, DACoffset1=0 and the DAC value is set initialized to this DACoffset value (step 212). The processor 132 then enables the fine actuator 112 (step 214). Due to a sticky actuator, high gain and/or DAC offsets, the fine actuator, and therefore the servo elements, may be, and probably will be, moving even with the a value of zero being input to the DAC 134. As noted above, if the fine actuator moves too far, the servo elements 120 will be outside of the servo pattern 130 resulting in a servo failure. The present invention, however, reduces the risk of servo failure. Instead of allowing the fine actuator 112 enough time to move outside the servo pattern 130, a counter, timer or other comparable component causes the processor 132 to wait a short amount of time T1 (step 216) and then obtain a new position P2 of the fine actuator 112 (step 218). A new DAC offset is calculated as being the previous offset plus the difference between the previous position and the new position; that is, DACoffset2=DACoffset1+(P2−P1) (step 220). T1 should be chosen to be short enough to prevent the servo elements 120 from moving outside of the servo patter 130. Preferably, to simplify processing, T1 may be chosen such that the resulting DAC offset, DACoffset2, is approximately equal to the gain of the driver 136.

In many cases, the effects of a sticky actuator, high gain and/or DAC offsets may be compensated after the single pass through the loop as described in the previous paragraph. However, additional accuracy may be obtained if the absolute value of the difference P2−P1 is compared with a predetermined threshold (step 222). If the difference is less than the threshold, there is no need for another pass, the process is complete and the fine actuator 112 may commence track following (step 224). However, if the absolute value of the difference is equal to or greater than the threshold, one or more additional passes may be made. In such an event, it is preferable that the number of passes be limited, such as to 10, to prevent an endless loop if there is a significant error or failure. Thus, in step 208, a loop counter may be initialized to zero. If the absolute value of the difference P2−P1 is equal to or greater than the threshold (step 222), the loop counter is incremented (step 226). If the new counter value has reach the limit (step 228), an error is posted (step 230) and the process ends in failure (step 232). If, however, the limit has not yet been reached, the fine actuator 112 is disabled (step 234) and the processor 132 waits for a predetermined period T2 (step 236) for the fine actuator to settle back to the initial position P1 (step 210). By way of example, T2 may be approximately four times T1. Thus, if T1=2.5 milliseconds (ms), at 50 microseconds (us) for 50 samples, then T2=(approximately) 10 ms (200 samples). The DAC value sent by the processor 132 to the DAC 134 is the then current DAC offset value (DACoffset2) (step 212). The process repeats until the absolute value of the difference P2−P1 is less than the threshold (in step 222) or until the loop limit has been reached (in step 228).

In an adaptive alternative, if the absolute value of the difference P2−P1 fails to fall below the threshold within the predefined number of loops, the wait time T1 may be adjusted up or down and the process repeated.

Once the absolute value of the difference P2−P1 has become less than the threshold, it is preferable to store the resulting DAC offset value DACoffset (step 238). This value then becomes the initial DAC offset value when another tape cartridge is loaded (step 200).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for initializing a servo tracking mechanism in a data tape drive.

What is claimed is:

1. A method for initializing a servo tracking mechanism in a data tape drive, comprising:
    loading a magnetic tape media cartridge into a data drive;
    activating a course motor to move servo elements until a servo pattern on the tape media is detected by the servo elements;
    allowing a fine actuator, to which the servo elements are mounted, to settle to an initial position P1;
    inputting an initial DAC output value into a servo driver, the initial DAC output value equaling an initial offset value DACoffset of 0;
    enabling the fine actuator with an output from the servo driver;
    waiting for a predetermined period of time T1;
    measuring a new position P2 of the fine actuator;
    calculating a new DAC offset value DACoffset2;
    applying the new DAC offset value to the DAC whereby a new DAC output value equals the initial DAC offset value plus the new DAC offset value; and
    initiating servo track following.

2. The method of claim 1, further comprising, prior to initiating servo track following:
    determining if the difference P2−P1 between the initial position P1 and the new position P2 is greater than a predetermined threshold; and
    if P2−P1 is greater than the threshold:
    disabling the fine actuator;
        allowing the fine actuator to resettle to the initial position P1;
        enabling the fine actuator with the output from the servo driver;
        waiting for the predetermined period of time T1;
        measuring a new position P3 of the fine actuator;
        calculating a new DAC offset value DACoffset3;
        applying the new DAC offset value to the DAC whereby a new DAC output value equals the previous DAC offset value plus the new DAC offset value; and
        initiating servo track following.

3. The method of claim 2, further comprising posting an error message if P2−P1 remains greater than the threshold after the steps of claim 2 have been completed the predetermined number of times.

4. The method of claim 2, further comprising adjusting the predetermined period of time T1 if P2−P1 remains greater than the threshold after the steps of claim 2 have been completed the predetermined number of times.

5. The method of claim 1, further comprising:
    storing the new DAC offset value; and
    applying the new DAC offset value to the DAC as an initial DAC offset value when another tape media cartridge is loaded into the drive.

6. The method of claim 1, further comprising predetermining the period of time T1 such that the new DAC offset is approximately equal to a gain of the servo driver.

7. A tape drive servo controller, comprising:
- a servo driver having an output coupled to drive a fine actuator to which is mounted a tape head having at least one servo element;
- a digital-to-analog converter (DAC) having an output coupled an input of the servo driver; and
- a servo processor comprising:
  - a first output coupled to activate a course motor to which the fine actuator is mounted when a magnetic tape media cartridge is loaded into the tape drive;
  - an input coupled to receive a position signal from the fine actuator;
  - a second output coupled to transmit a DAC offset to an input of the DAC;
  - means for enabling the fine actuator with an initial DAC offset value of 0 following a time in which the fine actuator can settle to an initial position P1;
  - means for measuring a new position P2 of the fine actuator following a wait of a predetermined period T1;
  - means for measuring a new position P2 of the fine actuator;
  - means for calculating a new DAC offset value;
  - means for applying the new DAC offset value to the DAC whereby a new DAC output value equals the initial DAC offset value plus the new DAC offset value; and
  - means for initiating servo track following.

8. The servo controller of claim 7, further comprising:
- means for, prior to initiating servo track following, determining if the difference P2−P1 between the initial position P1 and the new position P2 is greater than a predetermined threshold;
- means for disabling the fine actuator if P2−P1 is greater than the threshold;
- the means for enabling includes means for enabling the fine actuator with the output from the servo driver after the fine actuator has resettled to the initial position P1;
- the means for measuring includes means for measuring a new position P3 of the fine actuator following a wait of the predetermined period T1;
- the means for calculating includes means for calculating a new DAC offset value DACoffset3; and
- the means for applying includes means for applying the new DAC offset value to the DAC whereby a new DAC output value equals the previous DAC offset value plus the new DAC offset value.

9. The servo controller of claim 8, further comprising means for posting an error message if P2−P1 remains greater than the threshold.

10. The servo controller of claim 8, further comprising mean for adjusting the predetermined period time T1 if P2−P1 remains greater than the threshold.

11. The servo controller of claim 7, further comprising:
- means for storing the new DAC offset value; and
- means for applying the new DAC offset value to the DAC as an initial DAC offset value when another tape media cartridge is loaded into the drive.

12. The servo controller of claim 7, further comprising means for predetermining the period of time T1 such that the new DAC offset is approximately equal to a gain of the servo driver.

13. A computer program product of a computer readable medium usable with a programmable computer, the computer program product having computer-readable code embodied therein for initializing a servo tracking mechanism in a data tape drive, the computer-readable code comprising instructions for:
- loading a magnetic tape media cartridge into a data drive;
- activating a course motor to move servo elements until a servo pattern on the tape media is detected by the servo elements;
- allowing a fine actuator, to which the servo elements are mounted, to settle to an initial position P1;
- inputting an initial DAC output value into a servo driver, the initial DAC output value equaling an initial offset value DACoffset of 0;
- enabling the fine actuator with an output from the servo driver;
- waiting for a predetermined period of time T1;
- measuring a new position P2 of the fine actuator;
- calculating a new DAC offset value DACoffset2;
- applying the new DAC offset value to the DAC whereby a new DAC output value equals the initial DAC offset value plus the new DAC offset value; and
- initiating servo track following.

14. The computer program product of claim 13, the computer-readable code further comprising instructions for, prior to initiating servo track following:
- determining if the difference P2−P1 between the initial position P1 and the new position P2 is greater than a predetermined threshold; and
- if P2−P1 is greater than the threshold:
  - disabling the fine actuator;
  - allowing the fine actuator to resettle to the initial position P1;
  - enabling the fine actuator with the output from the servo driver;
  - waiting for the predetermined period of time T1;
  - measuring a new position P3 of the fine actuator;
  - calculating a new DAC offset value DACoffset3;
  - applying the new DAC offset value to the DAC whereby a new DAC output value equals the previous DAC offset value plus the new DAC offset value; and
  - initiating servo track following.

15. The computer program product of claim 14, the computer-readable instructions further comprising instructions for posting an error message if P2−P1 remains greater than the threshold after the instructions of claim 14 have been completed the predetermined number of times.

16. The computer program product of claim 14, the computer-readable code further comprising instructions for adjusting the predetermined period of time T1 if P2−P1 remains greater than the threshold after the instructions of claim 14 have been completed the predetermined number of times.

17. The computer program product of claim 13, the computer-readable code further comprising instructions for:
- storing the new DAC offset value; and
- applying the new DAC offset value to the DAC as an initial DAC offset value when another tape media cartridge is loaded into the drive.

18. The computer program product of claim 13, the computer-readable code further comprising instructions for predetermining the period of time T1 such that the new DAC offset is approximately equal to a gain of the servo driver.

* * * * *